J. W. CARRIKER.
SELF-LUBRICATING HOOK.
APPLICATION FILED AUG. 4, 1920.
1,358,616.
Patented Nov. 9, 1920.
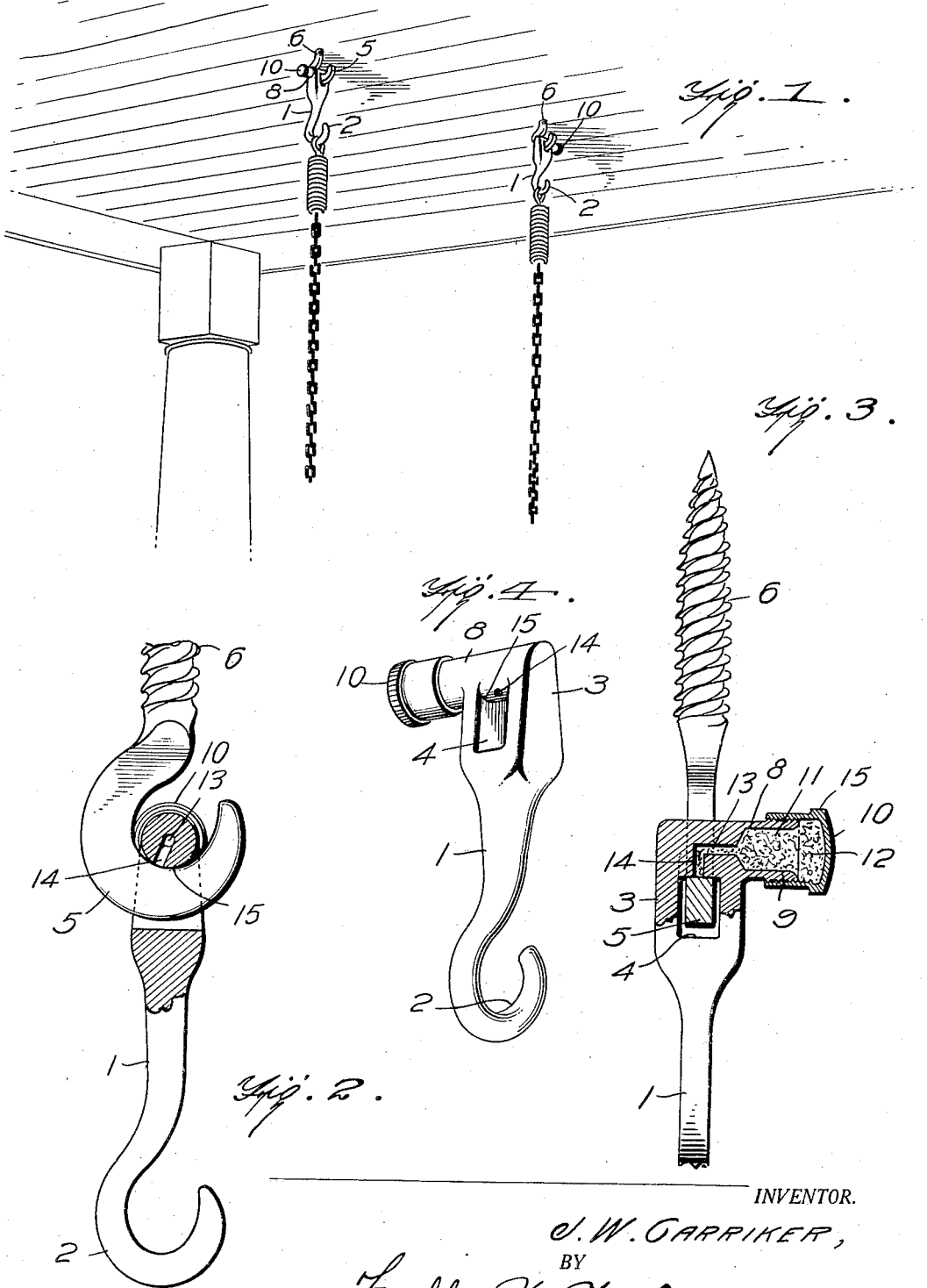
INVENTOR.
J. W. CARRIKER,
BY
Franklin H. Hough,
ATTORNEY.

UNITED STATES PATENT OFFICE.

JOHN W. CARRIKER, OF HARRISBURG, NORTH CAROLINA.

SELF-LUBRICATING HOOK.

1,358,616. Specification of Letters Patent. Patented Nov. 9, 1920.

Application filed August 4, 1920. Serial No. 401,245.

*To all whom it may concern:*

Be it known that I, JOHN W. CARRIKER, a citizen of the United States, residing at Harrisburg, in the county of Cabarrus and State of North Carolina, have invented certain new and useful Improvements in Self-Lubricating Hooks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel form of self-lubricating hook, which is adapted for use in many situations, as, for instance, for supporting porch swings, or hammocks.

A subsidiary object is to provide a self-lubricating hook which is very simple in construction and extremely practical from a manufacturing standpoint.

The preferred form of the invention is disclosed in the accompanying drawing, in which like reference characters designate corresponding parts throughout the several views. Briefly described:

Figure 1 is a perspective view of two of my hooks in operative position.

Fig. 2 is a view in side elevation, partly in section, of the hook shown suspended from an anchoring hook;

Fig. 3 is a fragmentary view, partly in section, of my hook, showing also, partly in section and partly in elevation, the anchoring hook from which the hook of my invention is suspended, and Fig. 4 is a view in perspective of the hook of my invention.

Referring now in detail to the drawing:

The hook comprises a shank 1, having a curved terminal 2, constituting the jaw of the hook, as usual. The portion of the shank 1 opposite the hook portion 2 is enlarged, as shown at 3, constituting a head, and is apertured, as shown at 4, to provide an eye for the reception of the jaw 5 of an anchoring hook having a threaded shank 6 whereby the same may be screwed into a wall, or roof, such as 7.

The enlarged portion 3 is provided with a lateral elbow 8 which is preferably annular in cross section and provided exteriorly at its free end with threads 9 engaged by complemental internal threads on a screw closure cap 10. The elbow 8 is recessed internally, as shown at 11, constituting a pocket for the reception of a suitable lubricant 12. Leading from the inner end of said pocket 11 and extending longitudinally of the elbow 8 is a port 13, having a right angled branch 14 having its exit end in communication with the aperture, or eye, 4 of the hook, and adapted to discharge lubricant upon the jaw 5 of the anchoring hook, which jaw bears upon the curved upper wall 15 of the eye, or aperture, 4, and through which wall said branch 14 is cut.

In operation, it will be seen that, as the hook of my invention swings upon the jaw 5 of the anchoring hook, lubricant will be disposed upon the inner curved surface of the jaw 5, upon which the hook of my invention has a bearing, thus effectively lubricating the moving part and preventing friction and squeaking. It will be noted that the compression of the lubricant 12 within the pocket 11 may be varied by screwing the cap 10 farther onto, or off of, the elbow 8. Conveniently, the cap 10 is provided with a milled circumferential bead 15', to prevent slipping of the hand of the operator in manipulating the cap.

What I claim to be new is:

A self-lubricating hook comprising a shank having a curved terminal constituting the jaw of the hook, and at its opposite end, an integral head provided with an eye and with an integral lateral elbow having an internal open-ended lubricant chamber, and a port leading therefrom and communicating with said eye, and means for closing the open end of said chamber.

In testimony whereof I hereunto affix my signature.

JOHN W. CARRIKER.